US010878112B2

(12) United States Patent
Nuzzi et al.

(10) Patent No.: US 10,878,112 B2
(45) Date of Patent: *Dec. 29, 2020

(54) RESTRICTIVE ACCESS OF A DIGITAL OBJECT BASED ON LOCATION

(71) Applicant: PayPal, Inc., San Jose, CA (US)

(72) Inventors: Frank Anthony Nuzzi, Pflugerville, TX (US); Shivkumar Krishnan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/006,435

(22) Filed: Jun. 12, 2018

(65) Prior Publication Data

US 2018/0357437 A1 Dec. 13, 2018

Related U.S. Application Data

(63) Continuation of application No. 13/234,278, filed on Sep. 16, 2011, now Pat. No. 9,996,701.

(51) Int. Cl.
*G06F 21/62* (2013.01)

(52) U.S. Cl.
CPC .. *G06F 21/6209* (2013.01); *G06F 2221/2111* (2013.01)

(58) Field of Classification Search
CPC .............. G06F 21/6209; G06F 2221/2111
USPC ......................................... 705/51; 726/27, 28
See application file for complete search history.

(56) References Cited

U.S. PATENT DOCUMENTS

| 868,784 | A | 10/1907 | Hookham |
| 7,447,784 | B2 * | 11/2008 | Eun ................... G06Q 30/0601 709/220 |
| 7,634,419 | B1 | 12/2009 | Travis et al. |
| 7,698,566 | B1 * | 4/2010 | Stone .................... H04L 63/08 713/186 |
| 7,801,824 | B1 * | 9/2010 | Bryar .................. G06Q 20/367 705/14.25 |
| 8,452,693 | B2 | 5/2013 | Shah et al. |
| 8,763,157 | B2 | 6/2014 | Navar et al. |
| 9,154,498 | B2 | 10/2015 | Byme et al. |
| 9,531,686 | B2 | 12/2016 | Navar et al. |

(Continued)

OTHER PUBLICATIONS

"Geocacher University: 7 Mystery and Puzzle Ideas", Dec. 15, 2010, pp. 1-6.

*Primary Examiner* — Jay Huang
(74) *Attorney, Agent, or Firm* — Haynes and Boone, LLP

(57) ABSTRACT

The present disclosure involves a method including: receiving a request to access an object from a user; prompting the user to go to a target location; receiving feedback from the user with respect to the user's location; determining, electronically by a processor, whether the user has reached the target location; granting access of the object to the user in response to the determining. The present disclosure involves a system including: a storage storing an electronic item; an electronic communications interface that: detects a request to access the item from an entity and prompts the entity to go to a target location in response to the request; a computer processor that: analyzes feedback from the entity with respect to the entity's location, determines whether the entity's location is sufficiently close to the target location, and grants or denies access of the item to the entity based on the determination.

20 Claims, 5 Drawing Sheets

(56) References Cited

U.S. PATENT DOCUMENTS

| | | | |
|---|---|---|---|
| 9,537,869 B2 | 1/2017 | Peterson | |
| 2002/0002541 A1* | 1/2002 | Williams | G06F 21/10 |
| | | | 705/51 |
| 2002/0112171 A1* | 8/2002 | Ginter | G06F 21/10 |
| | | | 713/185 |
| 2008/0120718 A1* | 5/2008 | Bentley | G06F 21/35 |
| | | | 726/21 |
| 2008/0146193 A1* | 6/2008 | Bentley | G06F 21/34 |
| | | | 455/411 |
| 2008/0167129 A1* | 7/2008 | Aaron | A63F 13/10 |
| | | | 463/42 |
| 2013/0060615 A1 | 3/2013 | Block et al. | |
| 2013/0074169 A1* | 3/2013 | Nuzzi | G06F 21/6209 |
| | | | 726/7 |

* cited by examiner

WELCOME! JOHN DOE

YOU ARE NOW LOGGED ON TO
SECURE PAYMENTS.COM!

THE FOLLOWING DOCUMENTS HAVE BEEN PREPARED:

- LAST LIVING WILL AND TESTAMENT
- DURABLE POWER OF ATTORNEY
- DIRECTIVE TO PHYSICIANS

TO VIEW THESE DOCUMENTS, PLEASE TAKE YOUR GPS-ENABLED DEVICE TO ONE OF THE FOLLOWING PLACE:

*3900 JUNIUS ST.*
*SUITE 610*
*DALLAS TX 75246*

RESTRICTIVE ACCESS OF A DIGITAL OBJECT BASED ON LOCATION

CROSS REFERENCED TO RELATED APPLICATIONS

This application is a continuation of U.S. patent application Ser. No. 13/234,278, filed on Sep. 16, 2011, (now issued as U.S. Pat. No. 9,996,701 on Jun. 12, 2018), the contents of which are incorporated by reference in its entirety.

BACKGROUND

Technical Field

The present disclosure generally relates to enhancing security to transaction and, more particularly, to restricting access of an electronic file at one or more specific locations.

Related Art

Online transactions are becoming more and more prevalent, with an ever-increasing number of online entities that may or may not have a physical real world counterpart. Furthermore, the services offered by these online entities have been improving as well. The popularity of online transactions is partially attributable to the ease and convenience of making a transaction online instead of at a physical location. It is also safer and more convenient to transfer funds online, since these transactions involve no actual cash.

As online transactions gain more popularity, the security of documents involved becomes more important. For example, it may be desirable to limit online access to sensitive documents such as mortgage agreements or wills to a small number of individuals who have the right to access these documents. Unfortunately, if these individuals' accounts are hacked, a hacker may be able to gain illegal access to these sensitive documents.

Therefore, while existing online transaction mechanisms have been generally adequate for their intended purposes, they have not been entirely satisfactory in every aspect. It would be advantageous to add additional levels of security to online transaction mechanisms so that access to sensitive documents is more restrictive.

SUMMARY

One of the broader forms of the present disclosure involves a method. The method involves: receiving a request to access an electronically-stored object from a user; prompting the user to go to a target location; receiving electronic feedback from the user with respect to the user's location; determining, electronically by a processor and based on the electronic feedback, whether the user has reached the target location; and granting access of the object to the user in response to the determining.

Another one of the broader forms of the present disclosure involves an apparatus comprising a non-transitory, tangible computer readable storage medium storing a computer program. The computer program has instructions that when executed, perform: receiving a request from a party to access a file stored on a computer server; verifying a location of the party based on electronic communication sent from the party; if the location of the party satisfies a set of predetermined criteria, granting electronic access of the file to the party; and if the location of the party fails to satisfy the set of predetermined criteria, denying electronic access of the file to the party.

Yet another one of the broader forms of the present disclosure involves a system. The system involves: an computer storage that stores an electronic item; an electronic communications interface that is operable to: detect a request to access the item from an entity; and prompt the entity to go to a target location in response to the request; and a computer processor that is operable to: analyze an electronic feedback from the entity with respect to the entity's location; make a determination as to whether the entity's location is sufficiently close to the target location; and grant or deny access of the item to the entity based on the determination.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

As the Internet continues to evolve, an increasing number of users may choose to engage in and complete transactions online. These transactions may include financial transactions. For example, a user may want to pay for products or services online. Some of these products or services may involve sensitive documents. For example, the user may be trying to purchase a house, in which case a sensitive document may include a mortgage loan agreement. As another example, the user may be asking an attorney to plan an estate, in which case a sensitive document may include a will.

Sensitive documents as those described above often times contain highly private data pertaining to the user and/or his family. Therefore, the user may wish to limit access of these documents to authorized individuals only. However, conventional online transaction mechanisms may not offer sufficient secured protection of these sensitive documents. The paragraphs below and the accompanying figures will describe a method and apparatus that offer enhanced security to sensitive documents according to various aspects of the present disclosure.

To facilitate the ensuing discussions, the following example is used. In this example, a user has requested a service—for example an estate planning service—using an online transaction provider. The user may be a single individual in one embodiment, but may also be an entity such as a business entity in other embodiments. The user may also include a plurality of individuals or entities in further embodiments. The online transaction provider may be any entity that is involved in facilitating the user's transaction. In some embodiments, the online transaction provider may include a bank with which the user maintains a checking or savings account (e.g., JP MORGAN CHASE®), a credit card company (e.g., AMERICAN EXPRESS®), a third party payment provider (e.g., PAYPAL, INC®. of San Jose, Calif.), or another suitable funding source. In some embodiments, the online transaction provider may also be the entity from whom the user requested service (e.g., an attorney or a mortgage company).

Figure 1:
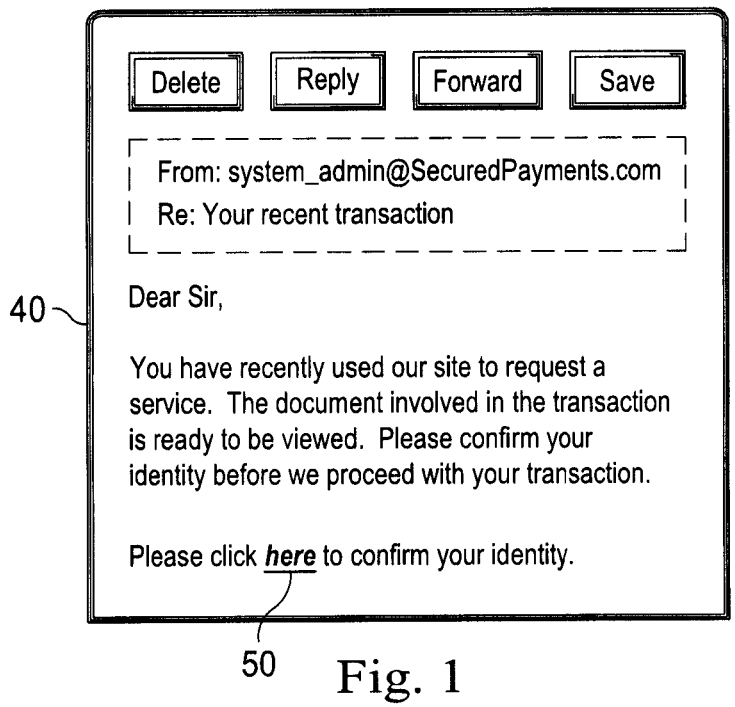
FIGS. 1-4 illustrate example user interfaces of an online transaction provider at different phases.

At some point, the user is notified that one or more sensitive documents associated with the requested service are now ready for viewing. FIG. 1 shows an example communication interface 40 from an online transaction provider. The interface 40 may include an electronic communication message sent to the user from the online transaction provider. In the embodiment illustrated in FIG. 1, the electronic communication message is an email. In other embodiments, the electronic communication message may be a text message or a telephone call. The electronic communication message may contain text stating "Dear Sir, you have recently used our site to request a service. The document involved in the transaction is ready to be viewed. Please confirm your identity before we proceed with your transaction." The electronic communication message may include a link 50 on which the user can click to confirm his identity.

Figure 2:
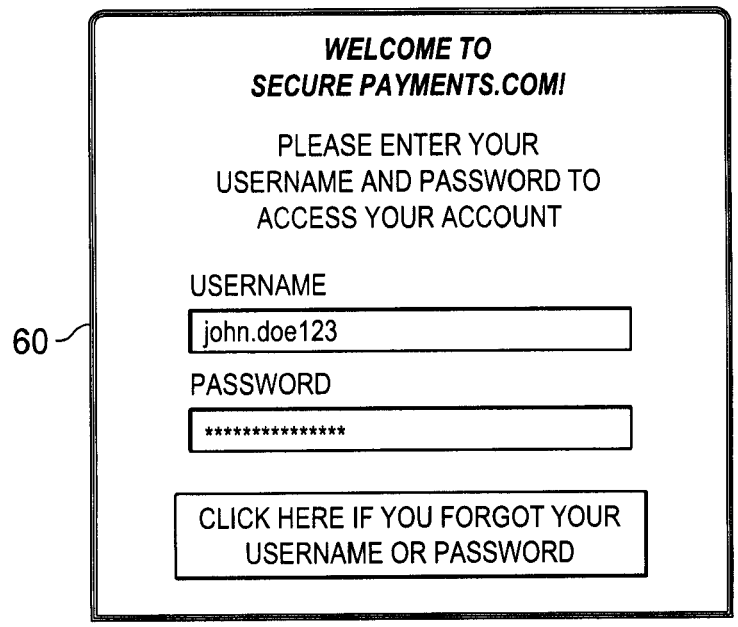

Referring to FIG. 2, after the user clicks on the link 50, he is directed to a communication interface 60 of the online transaction provider. The communication interface 60 prompts the user to enter his username and password to access his account. The requirement for a correct combination of username (or login name) and password (or pass code/PIN) may offer a first level of security, in that it is generally able to prevent unauthorized access to the user's account. However, a hacker with advanced computer knowledge may "crack" the user's username and password, particularly if the username and password are poorly chosen such that they have low protection strength.

For example, for reasons of simplicity, a user may choose a username that is merely his name (e.g., JohnDoe) or a simple variation of his name (e.g., JohnDoe123). For the same reasons, the user may also choose a password that is uncomplicated and easy to memorize (e.g., his birthday: 10131975, or commonly chosen passwords: password1, qwerty, etc). In doing so, the user may have inadvertently reduced the protection strength of his username and password and made them easy to be cracked by a hacker. Therefore, although the requirement for a correct combination of username and password affords some level of protection for sensitive documents, it may not be enough, and that additional levels of security may be needed. Such security is offered according to various aspects of the present disclosure, as discussed below.

Figure 3A:
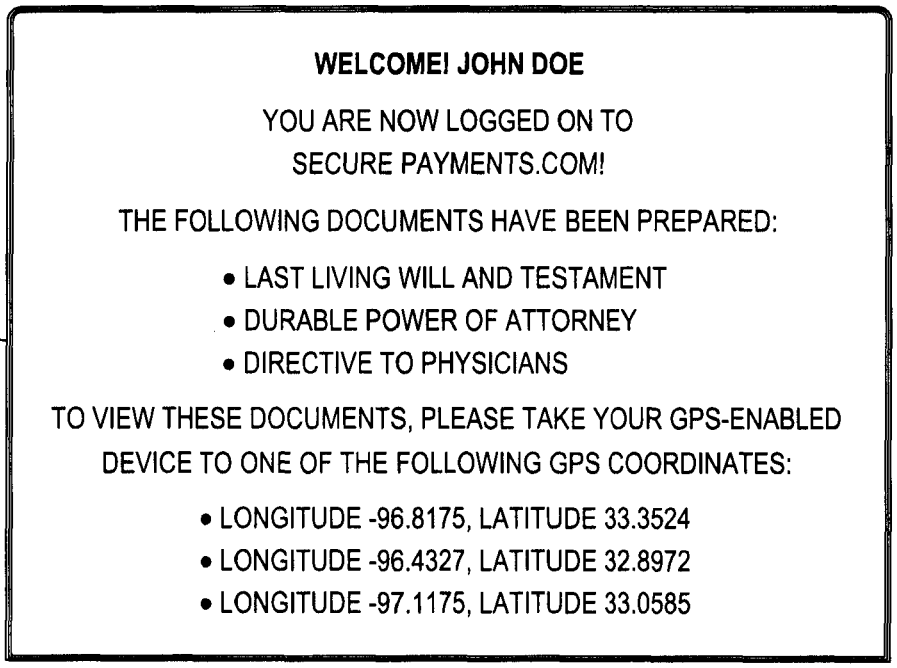

Once the user inputs the correct combination of username and password, another communication interface 80 is displayed to the user, as shown in FIG. 3A. The communication interface 80 informs the user that a list of sensitive documents have been prepared. In the illustrated embodiment, these sensitive documents include a "Last Living Will and Testament," a "Durable Power of Attorney," and a "Directive to Physicians." It is understood that these documents are merely examples, and that the sensitive documents may include other types of documents in other embodiments, such as mortgage loans, lawsuit settlements, divorce agreements, fund transfer receipts, promissory notes, etc. Regardless of the type of document, these documents may be in a digital format and may be stored electronically on a computer server. As such, they may also be referred to as digital/electronic files or digital/electronic objects. In some embodiments, the user may be given partial access to one or more of these documents, for example a preview of these documents where the user can see a table of contents and/or the number of pages of a document.

The communication interface 80 also instructs the user that, in order to view the documents, he needs to take one of his GPS-enabled (Global Position System) devices to a set of GPS coordinates among a list of coordinates. Each set of GPS coordinates defines a respective target location. For example, a location may be the firm office of the attorney who drafted these documents. As another example, a location may be a bank which provided the mortgage loan. As yet another example, a location may be a public building, such as a police station, a school, or a library.

The user may have previously been asked to register one of his GPS-enabled devices with the online transaction provider (or with a third party identity verification authority). The GPS-enabled device may be a mobile phone, a tablet, a laptop equipped with a GPS transceiver, a GPS navigator, or another suitable device that transmits GPS signals. In some embodiments, the user may be allowed to register several GPS-enabled devices. When the user arrives at the target location with his GPS-enabled device, the GPS signals emitted by his GPS-enabled device are detected by the online transaction provider (for example through a GPS satellite). Through a computer processor, the online transaction provider analyzes the GPS signals received from the user and makes a determination as to whether these signals are consistent with the GPS device(s) previously registered. If so, then the online transaction provider may grant access of the sensitive documents to the user. The user may be able to open, download, or otherwise manipulate the documents. If not, then the online transaction provider may deny access of the sensitive documents to the user and may optionally display a warning message.

In the manner described above, the locational requirement adds another level of security for the protection of the sensitive documents. For a hacker to be able to gain access to the sensitive documents, not only must he obtain the user's username and password, but he needs to know which of the owner's GPS-enabled devices are registered, and he also needs to take actual physical possession of one of these devices to the target location. Short of stealing or robbing the user, it may be quite difficult for the hacker to take physical possession of the GPS-enabled devices, as most hackers tend to operate "behind the scenes." Therefore, requiring the user to be at a target location with a GPS-enabled device before gaining access to certain documents adds an additional level of security to these documents.

Figure 3C:
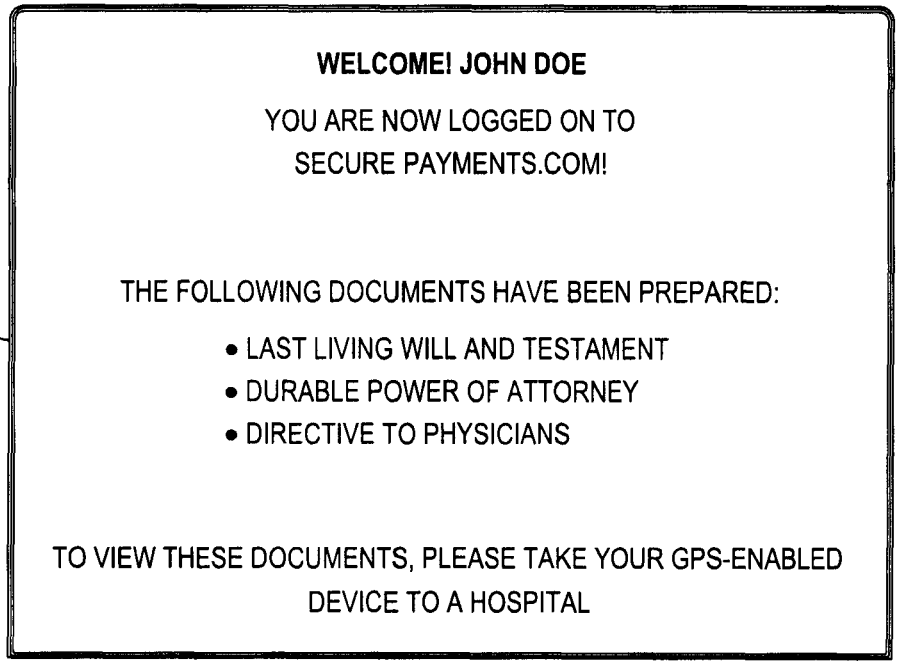
Figure 3B:
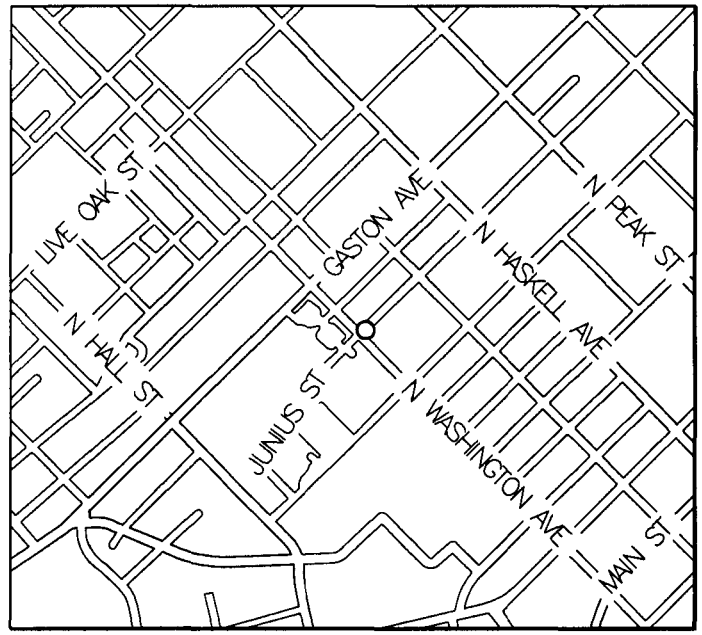

It is understood that the interface 80 shown in FIG. 3A is merely one of the many embodiments suitable for verifying the user's identity. FIGS. 3B and 3C illustrate alternative embodiments for the interface 80. For example, in the embodiment illustrated in FIG. 3B, instead of displaying a set of GPS coordinates, the communication interface 80 directly displays an address of the target location to the user, as well as a map corresponding to the address. In other variations of the embodiment illustrated in FIG. 3B, additional addresses and maps associated with alternative target locations may be displayed to the user as well. In some embodiments, the GPS coordinates and the addresses of FIGS. 3A and 3B may contain hyperlinks, such that they will pull up a map when clicked on.

In the embodiment illustrated in FIG. 3C, the user interface 80 displays a generic location name to the user rather than a set of GPS coordinates. For example, the generic location may be a hospital, where a doctor needs to view the user's medical directive. It is understood that a hospital is used merely as an example to indicate a generic location. Other generic locations may include banks, schools, government facilities, parks, etc.

Although not specifically illustrated herein for the sake of simplicity, it is understood that the communication interface 80 may be implemented differently in other embodiments. For example, the communication interface 80 may display only one target location (or one set of GPS coordinates). In yet other embodiments, the communication interface 80 may display a location that is contextually based. For example, the communication interface 80 may state, "please take your GPS-enabled device to the place where you first met with the attorney." Such information is known to the user himself, but is not readily known to the general public and therefore not known to the hacker either. Consequently, it may be even more difficult for the hacker to gain access to the sensitive documents.

In some embodiments, instead of requiring the user to go to a target location, the interface 80 may inform the user that he can stay at (or go back to) his home. Thereafter, he will receive a phone call from the online transaction provider, as the phone number may have been registered with the online transaction provider during account setup. During the phone call, the user may be asked security questions, the answers to which are not generally known to the public. As examples, the security questions may include the user's wedding date, his favorite TV show, his first car, his first grade teacher's name, etc. The user may have supplied these answers previously. Once again, this process will thwart a hacker because the hacker would have to go to the user's home and answer the user's phone, which involves breaking and entering. In addition, even if the hacker has taken physical possession of the user's home and/or phone, the hacker would still have to know the answers to the security questions. Since neither of these scenarios is likely, the sensitive documents are afforded good security protection. In another embodiment, if simplicity is desired, the user may be verified through a GPS-enabled device, rather than being verified through a telephone call.

Though the present embodiment illustrates location-restricted access of sensitive documents by way of GPS signals, it is understood that other mechanisms may be utilized to ascertain a user's location as well. In one embodiment, the user may be prompted to bring a portable device with network connectivity to one of the target locations. For example, the portable device may be a laptop, a tablet, or a phone. The portable device may be allowed to connect to a network at the target location, so that the portable device is assigned an Internet Protocol (IP) address. The IP address may be received and analyzed by the online transaction provider. Based on the results of the analysis, the online transaction provider may ascertain whether the user has physically arrived at the target location, and consequently whether access to the sensitive documents should be granted to the user.

In a different embodiment, the user may be prompted to bring a mobile telephone to one of the target locations. Once there, the user's mobile phone communicates with cell towers nearby (for example through a cellular band or mode). The cell towers can be used to triangulate the user's position based on communication with the user. In that manner, the online transaction provider may ascertain whether the user has physically arrived at the target location, and consequently whether access to the sensitive documents should be granted to the user.

In another embodiment, the user may be prompted to bring a device with digital photographing capabilities (such as a digital camera or a camera phone) to one of the target locations. Once there, the user can take a digital picture of the target location and then send the picture (for example through email) to the online transaction provider. In some embodiments, the GPS coordinates of the location may be embedded within the digital picture. The online transaction provider may electronically analyze these pictures, and correspondingly ascertain whether the user has physically arrived at the target location. Based on the analysis results, the online transaction provider may decide whether access to the sensitive documents should be granted to the user.

In yet another embodiment, the user may arrive at the target location and meet with a person at the target location. The person may be an attorney, a paralegal, a legal secretary, a mortgage loan officer, or another suitable official who can verify the user's identity in person. After the user's identity has been verified by such person, the user may be given a security code or a confirmation code. The user may send the security code to the online transaction provider, and if the code is correct, access to the sensitive documents may be granted to the user.

As discussed above, the user may include more than one individual. Thus, the user discussed above may constitute multiple users or multiple parties in some cases. In embodiments where the user includes two or more users, each of the users may be asked to go to a respective target location. For example, a husband may be on a business trip to Texas, and his wife is in California. While the husband is in Texas, he is prompted that his mortgage loan agreement is ready for viewing. In that case, the husband may be prompted to go to a target location in Texas (for example, a branch of the loan-issuing bank in Texas), and the wife may be prompted to go to a target location in California (for example, a branch of the loan-issuing bank in California) before access to the mortgage loan agreement is viewable by either one of them.

Other scenarios are possible involving multiple users. For example, in an embodiment, one or more of the multiple users may be prompted to go to the same target location. In another embodiment, only a subset (instead of all) of the users is required to be at their respective target locations before access is granted. In yet another embodiment, different levels of access are granted to different users. For example, the wife in the above example may be allowed to view the document in its entirety, while the husband may be allowed to view only a portion of the document.

It some embodiments, the access to the sensitive documents may only be granted for a predetermined period of time. For example, once the user has been deemed to be at the target location, and the sensitive documents are "unlocked," the user may be notified that he only has one hour (or any other suitable amount of time) to download or view the documents. After this time expires, the access to the documents may become restricted again. The time-based restriction to document access in addition to location-based restriction further enhances the security of the documents.

Figure 4:
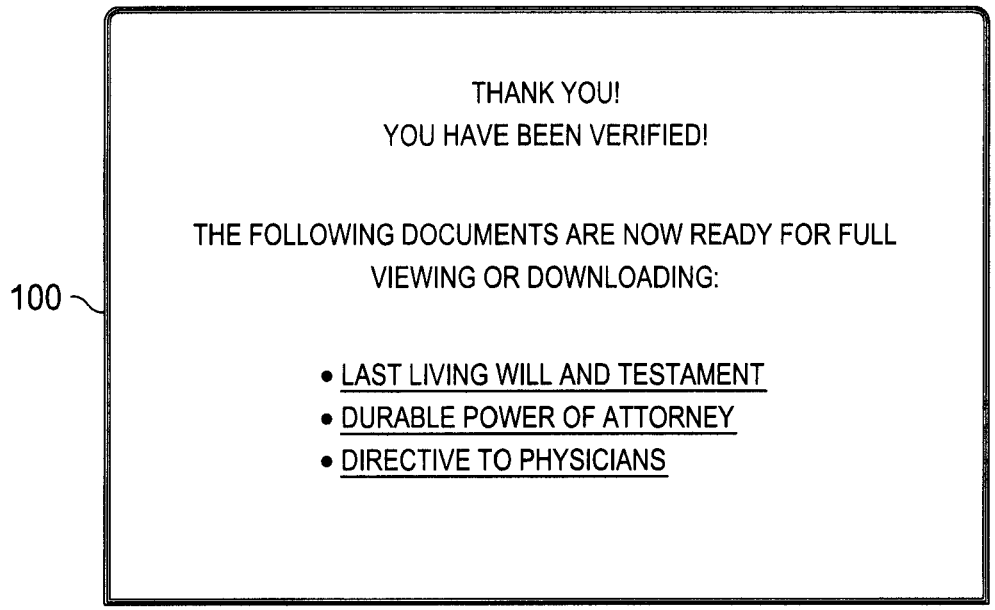

Returning to the embodiment illustrated in FIG. 3A, once the user takes his GPS-enabled device to one of the target locations defined by the GPS coordinates, access to the documents is granted. This is indicated in the communication interface 100 illustrated in FIG. 4. The same would happen for the embodiment illustrated in FIG. 3B, after the user takes his GPS-enabled device to a specific text-based or map-based address. For the embodiment illustrated in FIG. 3C, once the user takes his GPS-enabled device to the generic location such as a hospital, a reverse GPS process is executed to determine if the location the user is at is in fact a hospital. If so, then access to the documents can be granted to the user. It is understood that in some embodiments, a certain predefined tolerance may be built in for the determination of whether the user has in fact arrived at the target location. That is, the user may be within a certain number of feet or meters within the exact target location to be considered physically present at the target location.

In some embodiments, the interface 80 may contain a confirmation button (or another suitable mechanism), on which the user needs to click to notify the online transaction provider that he has arrived at the target location. The click of the button sends an alert signal to the online transaction provider, which can then begin the verification process.

In some embodiments, access to all the documents is granted when the user is verified to be at anyone of several locations displayed by the user interface 80. In other embodiments, access to each document (or to a subset of documents) may be granted at one of the particular locations displayed by the user interface 80, where access to other documents may be granted at another one of the locations displayed by the user interface 80. Stated differently, each document (or each subset of documents) may be unlocked at a different one of several locations.

In one embodiment, the interfaces discussed above and illustrated in FIGS. 1-4 may be implemented using Internet web pages. In other words, the user may access these interfaces through an Internet web browser, such as Internet Explorer® or Firefox®. In another embodiment, these interfaces may be accessed as an application software, also known as an "App" that may be downloaded in an "App store." For example, the app stores may be available for an IOS® or Android® enabled smart-phone or tablet.

It is also understood that the user may be able to change the security level of his account, or the security level of the documents specifically. In more detail, the documents may be designated with a relatively low security level by default, for example a security level that allows access by the user without location-based restrictions. Through a suitable interface similar to those discussed above, the user may be able to change the security level of the documents to a high level that requires the user (or multiple users) to be at the target location(s) before the document can be accessed.

Conversely, the user may adjust the security level of a document from a higher level down to a lower level, where location-based access is unnecessary, or that it only requires a subset of the criteria discussed above to be met. For instance, in a low security level, a document may be accessed if a subset of a multiple users is present at any one of a plurality of locations, whereas these users may all need to be at their target locations in a high security level. Other differences between high and low security levels are contemplated but are not discussed herein for the sake of simplicity.

The user may be allowed to change these security levels for the account as a whole (which affects all the documents associated with the account), or for each document individually. The ability to change the security level of the documents (or of the account) gives the user more control and flexibility in managing his documents.

Figure 5:
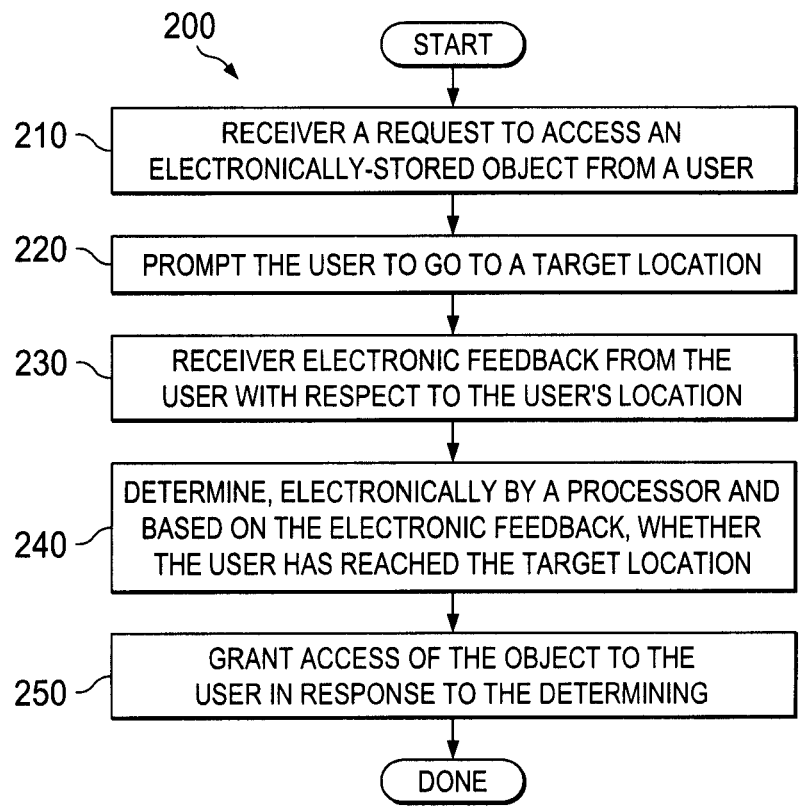
FIG. 5 illustrates a flowchart containing process flows according to various aspects of the present disclosure.

FIG. 5 is a flowchart illustrating a method 200 for performing an online transaction according to various aspects of the present disclosure. The method 200 includes a block 210 in which a request to access an electronically-stored object is received from a user. In an embodiment, the user includes a plurality of different parties. In an embodiment, the object is a digital file or electronic document stored on a computer server. The file or document may contain private or sensitive information, such that the user wishes to restrict access to the file or document.

The method 200 includes a block 220 in which the user is prompted to go to a target location. The user may be prompted to take a GPS-enabled device to the target location. In an embodiment, contextually-based instructions are displayed to the user. The contextually-based instructions are known by a correct user but not publicly known.

The method 200 includes a block 230 in which electronic feedback is received from the user with respect to the user's location. In an embodiment, the electronic feedback may be one of: a GPS signal, a mobile telephone signal, an IP address, a digital picture of the target location, and a confirmation code.

The method 200 includes a block 240 in which a determination is made as to whether the user has reached the target location. The determination is made electronically by a processor and based on electronic feedback from the user's device. The user may be deemed to be sufficiently close to the target location if the GPS coordinates contained in the electronic feedback are within a predetermined threshold of the GPS coordinates of the specified target location. For example, the predetermined threshold may require the received GPS coordinates to be within 0.0001% (or another suitable number) of the specified GPS coordinates.

The method 200 includes a block 250 in which access of the object is granted to the user in response to the determination made in block 240. In an embodiment, the access of the object is granted to the user if it has been determined that the user is at the target location. In an embodiment, when the access of the object is granted, it access is limited to a predetermined time period.

It is understood that the method 200 may include additional steps that may be performed before, during, or after the blocks 210-250. For example, before the access of the object is granted to the user, the user may be required to enter a correct combination of a username and a password. As another example, the method 200 may allow the user to change the security level associated with the user's account. The security level may specify a manner in which the object can be accessed. As yet another example, the method 200 may offer the user a preview of the object.

Figure 6:
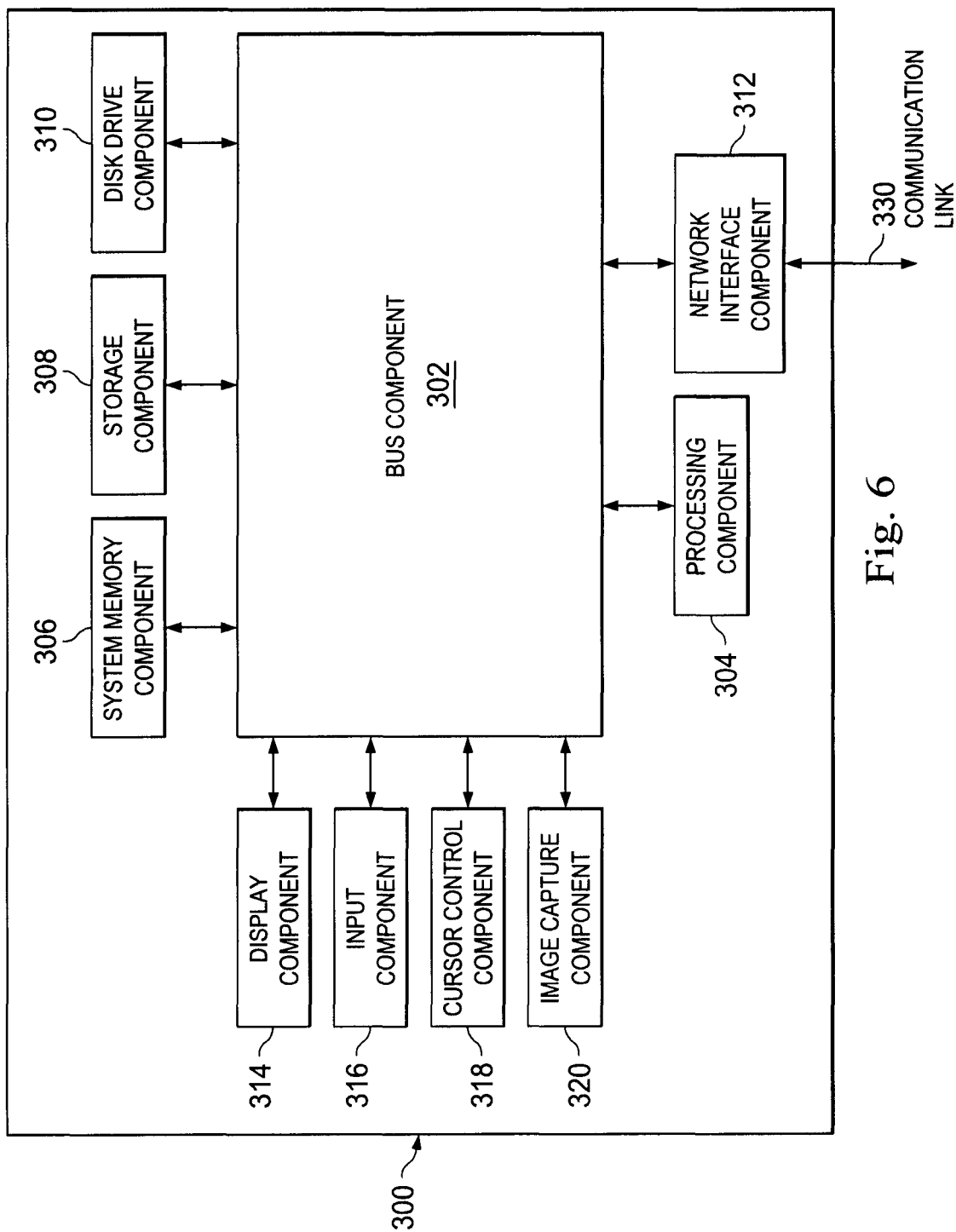
FIG. 6 illustrates a block diagram of a computer system for implementing various methods and devices described according to various aspects of the present disclosure.

FIG. 6 is a block diagram of a computer system 300 suitable for implementing various methods and devices described herein, for example, the various method blocks of the method 200. In various implementations, user devices may comprise a network communications device (e.g., mobile cellular phone, laptop, personal computer, tablet, etc.) capable of communicating with a network, and a transaction provider device may comprise a network computing device (e.g., a network server, a computer processor, an electronic communications interface, etc). Accordingly, it should be appreciated that each of the devices may be implemented as the computer system 300 for communication with the network in a manner as follows.

In accordance with various embodiments of the present disclosure, the computer system 300, such as a mobile communications device and/or a network server, includes a bus component 302 or other communication mechanisms for communicating information, which interconnects subsystems and components, such as processing component 304 (e.g., processor, micro-controller, digital signal processor (DSP), etc.), system memory component 306 (e.g., RAM), static storage component 308 (e.g., ROM), disk drive component 310 (e.g., magnetic or optical), network interface component 312 (e.g., modem or Ethernet card), display component 314 (e.g., cathode ray tube (CRT) or liquid crystal display (LCD)), input component 316 (e.g., keyboard), cursor control component 318 (e.g., mouse or trackball), and image capture component 320 (e.g., analog or digital camera). In one implementation, disk drive component 310 may comprise a database having one or more disk drive components.

In accordance with embodiments of the present disclosure, computer system 300 performs specific operations by processor 304 executing one or more sequences of one or more instructions contained in system memory component 306. Such instructions may be read into system memory component 306 from another computer readable medium, such as static storage component 308 or disk drive component 310. In other embodiments, hard-wired circuitry may be used in place of (or in combination with) software instructions to implement the present disclosure.

Logic may be encoded in a computer readable medium, which may refer to any medium that participates in providing instructions to processor 304 for execution. Such a medium may take many forms, including but not limited to, non-volatile media and volatile media. In one embodiment, the computer readable medium is non-transitory. In various implementations, non-volatile media includes optical or magnetic disks, such as disk drive component 310, and volatile media includes dynamic memory, such as system memory component 306. In one aspect, data and information related to execution instructions may be transmitted to computer system 300 via a transmission media, such as in the form of acoustic or light waves, including those generated during radio wave and infrared data communications. In various implementations, transmission media may include coaxial cables, copper wire, and fiber optics, including wires that comprise bus 302.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 330 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 300 may transmit and receive messages, data, information and instructions, including one or more programs (i.e., application code) through communication link 330 and communication interface 312. Received program code may be executed by processor 304 as received and/or stored in disk drive component 310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   one or more computer-readable memories storing program instructions; and
   one or more processors configured to execute the program instructions to cause the system to perform operations comprising:
   determining a first electronically stored object is associated with a second level of security, wherein the second level of security is a higher level of security than a first level of security, wherein access to the first electronically stored object associated with the second level of security is location based, and wherein access to an electronically stored object associated with the first level of security is not location based; and
   in response to the determining that the first electronically stored object is associated with the second level of security:
   transmitting a message to a user instructing the user to go to a first location; and
   in response to determining the user is in the first location, granting the user access to the first electronically stored object.

2. The system of claim 1, wherein the user is granted access to the first electronically stored object for a predetermined time period.

3. The system of claim 1, wherein the determining the user is in the first location includes analyzing location information received from a user device of the user, wherein the location information includes global positioning system (GPS) coordinates.

4. The system of claim 3, wherein the determining that the user is in the first location further includes determining that the GPS coordinates in the location information are within a predetermined threshold of a GPS coordinates associated with the first location.

5. The system of claim 1, wherein the determining the user is in the first location includes analyzing one or more digital pictures, received from a user device of the user, corresponding to the first location.

6. The system of claim 1, wherein the determining the user is in the first location includes detecting that a user device of the user has established a connection with a network associated with the first location.

7. The system of claim 1, wherein the operations further comprise:
   determining a second electronically stored object is associated with the first level of security; and
   in response to the determining that the second electronically stored object is associated with the first level of security, granting the user access to the second electronically stored object.

8. A method comprising:
   determining a first electronically stored object is associated with a second level of security;
   in response to the determining that the first electronically stored object is associated with the second level of security:
     transmitting a message to a user instructing the user to go to a first location; and
     in response to determining the user is in the first location, granting the user access to the first electronically stored object;
   determining a second electronically stored object is associated with a first level of security; and
     in response to the determining that the second electronically stored object is associated with the first level of security, granting the user access to the second electronically stored object.

9. The method of claim 8, wherein the user is granted access to the first electronically stored object for a predetermined time period.

10. The method of claim 8, wherein the determining the user is in the first location includes analyzing location information received from a user device of the user, wherein the location information includes global positioning system (GPS) coordinates.

11. The method of claim 10, wherein the determining that the user is in the first location further includes determining that the GPS coordinates in the location information are within a predetermined threshold of a GPS coordinates associated with the first location.

12. The method of claim 8, wherein the determining the user is in the first location includes analyzing one or more digital pictures, received from a user device of the user, corresponding to the first location.

13. The method of claim 8, wherein the determining the user is in the first location includes detecting that a user device of the user has established a connection with a network associated with the first location.

14. The method of claim 8, wherein the determining the user is in the first location includes utilizing mobile device triangulation techniques to identify that a mobile device of the user is in the first location.

15. A non-transitory computer readable medium storing program instructions, the program instructions when executed cause a machine to perform operations comprising:
   determining an electronically stored object is associated with a second level of security, wherein the second level of security is a higher level of security than a first level of security, wherein access to the electronically stored object associated with the second level of security is location based, and wherein access to an electronically stored object associated with the first level of security is not location based; and
   in response to the determining that the electronically stored object is associated with the second level of security:
     transmitting a message to a user instructing the user to go to a first location; and
     in response to determining the user is in the first location, granting the user access to the electronically stored object.

16. The non-transitory computer readable medium of claim 15, wherein the user is granted access to the electronically stored object for a predetermined time period.

17. The s non-transitory computer readable medium of claim 15, wherein the determining the user is in the first location includes analyzing location information received from a user device of the user, wherein the location information includes global positioning system (GPS) coordinates.

18. The non-transitory computer readable medium of claim 15, wherein the determining the user is in the first location includes analyzing one or more digital pictures, received from a user device of the user, corresponding to the first location.

19. The non-transitory computer readable medium of claim 15, wherein the determining the user is in the first location includes detecting that a user device of the user has established a connection with a network associated with the first location.

20. The non-transitory computer readable medium of claim 15, wherein the determining the user is in the first location includes utilizing mobile device triangulation techniques to identify that a mobile device of the user is in the first location.

* * * * *